US009000977B2

(12) United States Patent
Katz

(10) Patent No.: US 9,000,977 B2
(45) Date of Patent: Apr. 7, 2015

(54) INDOOR ALTITUDE MEASUREMENT BY GNSS RECEIVER

(75) Inventor: Daniel A. Katz, Kiryat Ono (IL)

(73) Assignee: Daniel A. Katz, Kiryat-Ono (IL)

( * ) Notice: Subject to any disclaimer, the term of this patent is extended or adjusted under 35 U.S.C. 154(b) by 137 days.

(21) Appl. No.: 13/276,378

(22) Filed: Oct. 19, 2011

(65) Prior Publication Data

US 2013/0099962 A1   Apr. 25, 2013

(51) Int. Cl.
*G01S 19/46* (2010.01)

(52) U.S. Cl.
CPC ...................................... *G01S 19/46* (2013.01)

(58) Field of Classification Search
USPC ............ 342/357.28, 357.4, 357.48, 386, 458, 342/462, 465; 701/468, 470
See application file for complete search history.

(56) References Cited

U.S. PATENT DOCUMENTS

| 4,060,809 A | * | 11/1977 | Baghdady | ...................... | 342/451 |
| 4,910,526 A | * | 3/1990 | Donnangelo et al. | ......... | 342/455 |
| 5,583,513 A | * | 12/1996 | Cohen | ...................... | 342/357.42 |

* cited by examiner

*Primary Examiner* — Dao Phan

(57) ABSTRACT

Global Navigation Satellite Systems (GNSS), such as the US GPS, the European GALILEO and the Russian GLONASS are very limited indoors, due to very low power levels and significant multipath. So, though hundreds of millions of people around the world use GPS receivers, particularly embedded in mobile devices, they cannot use these devices indoors, where they stay most of the time. Present art methods for augmenting or assisting GPS indoors, are mainly based on cellular or WLAN networks, and embedded sensors such as accelerometers and compasses, yet no integrated solution was launched. The present invention discloses a method that may contribute to GNSS indoors navigation, enabling a GNSS receiver to measure its elevation above sea level, indoors, to a floor resolution. The disclosed method is based on terrestrial infrastructure, yet possibly only one beacon per building.

20 Claims, 9 Drawing Sheets

System with Cable

Figure 1 – Basic GPS Trilateration Concept
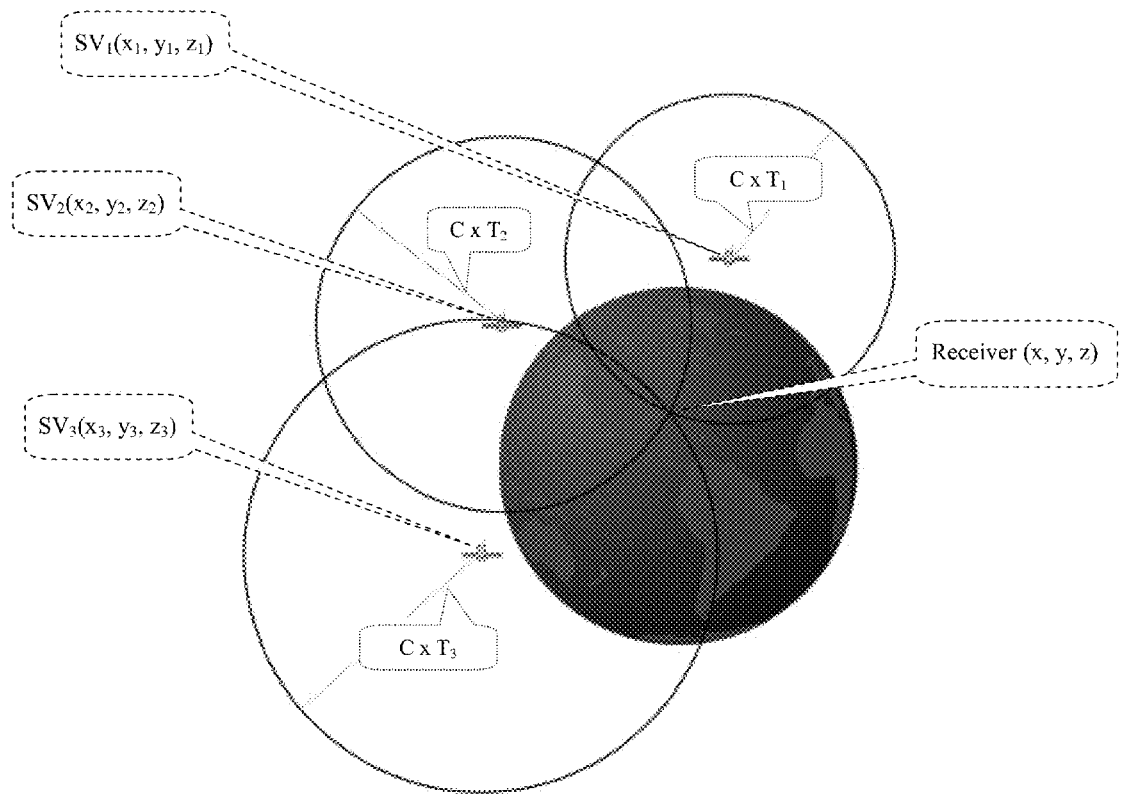
$\sqrt{[(x-x_1)^2 + (y-y_1)^2 + (z-z_1)^2]}$ = C x [Transmission Travel Time from $SV_1$ to Receiver] = C x $T_1$
$\sqrt{[(x-x_2)^2 + (y-y_2)^2 + (z-z_2)^2]}$ = C x [Transmission Travel Time from $SV_2$ to Receiver] = C x $T_2$
$\sqrt{[(x-x_3)^2 + (y-y_3)^2 + (z-z_3)^2]}$ = C x [Transmission Travel Time from $SV_3$ to Receiver] = C x $T_3$ Figure 2 – Satellite (SV) Orbit and Keplerian Elements
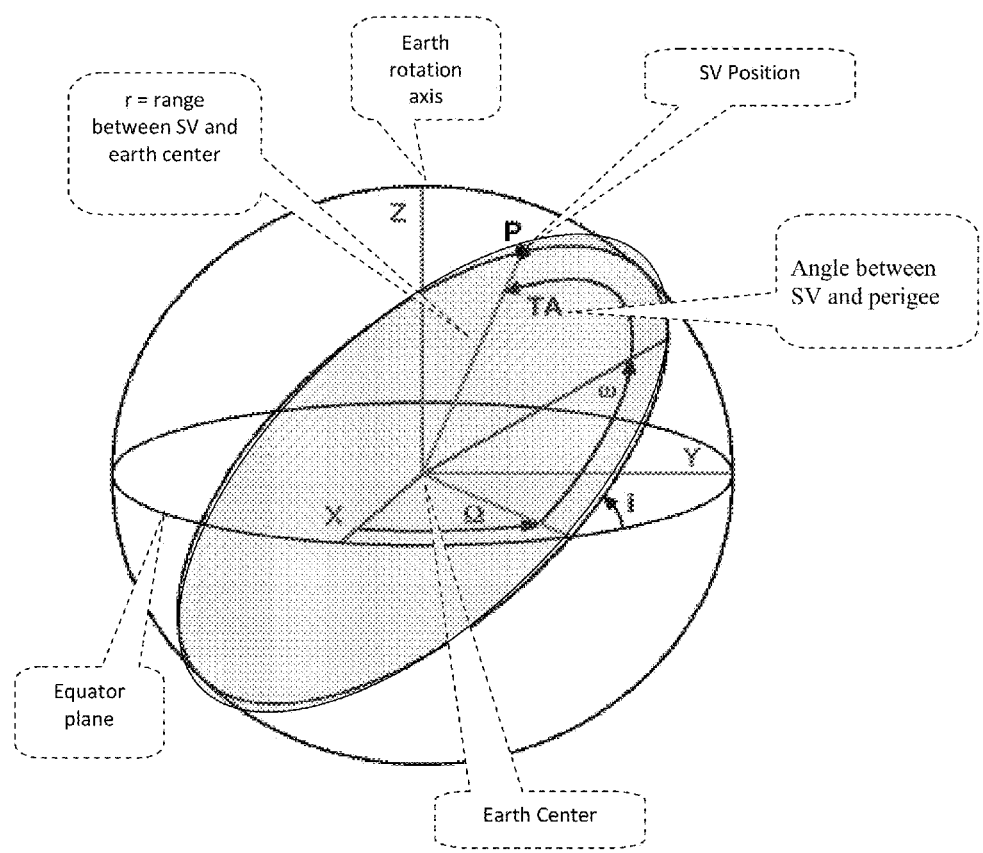
Keplerian Elements
a = semi-major axis of orbit ellipse
e = eccentricity of orbit ellipse
i = inclination between orbit plane and equator plane
$\Omega$ = RA (Longitude) of Ascending Node (RAAN)
$\omega$ = argument (angle) of perigee
$T_0$ = Time when Satellite is at Perigee

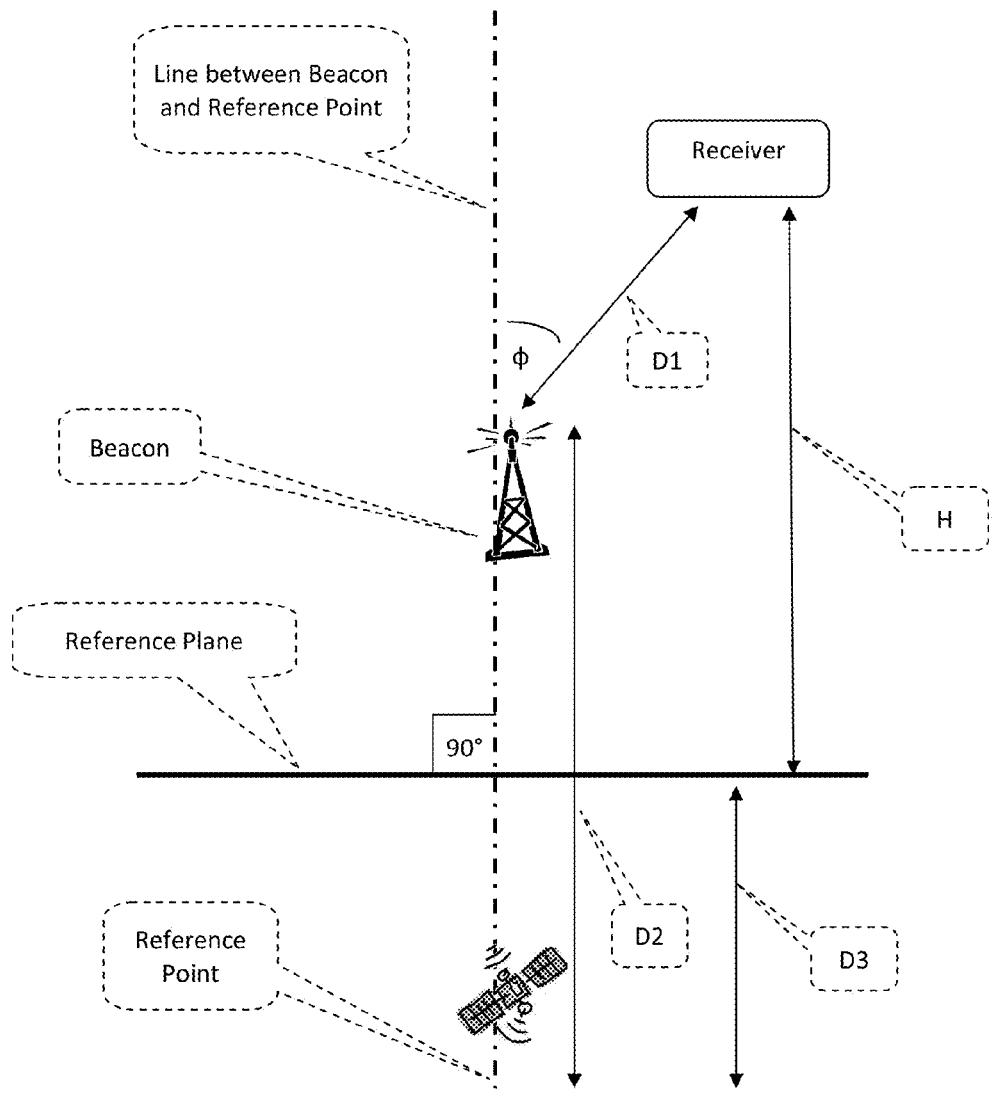
Figure 3 – Basic Geometry of System for Measuring Elevation

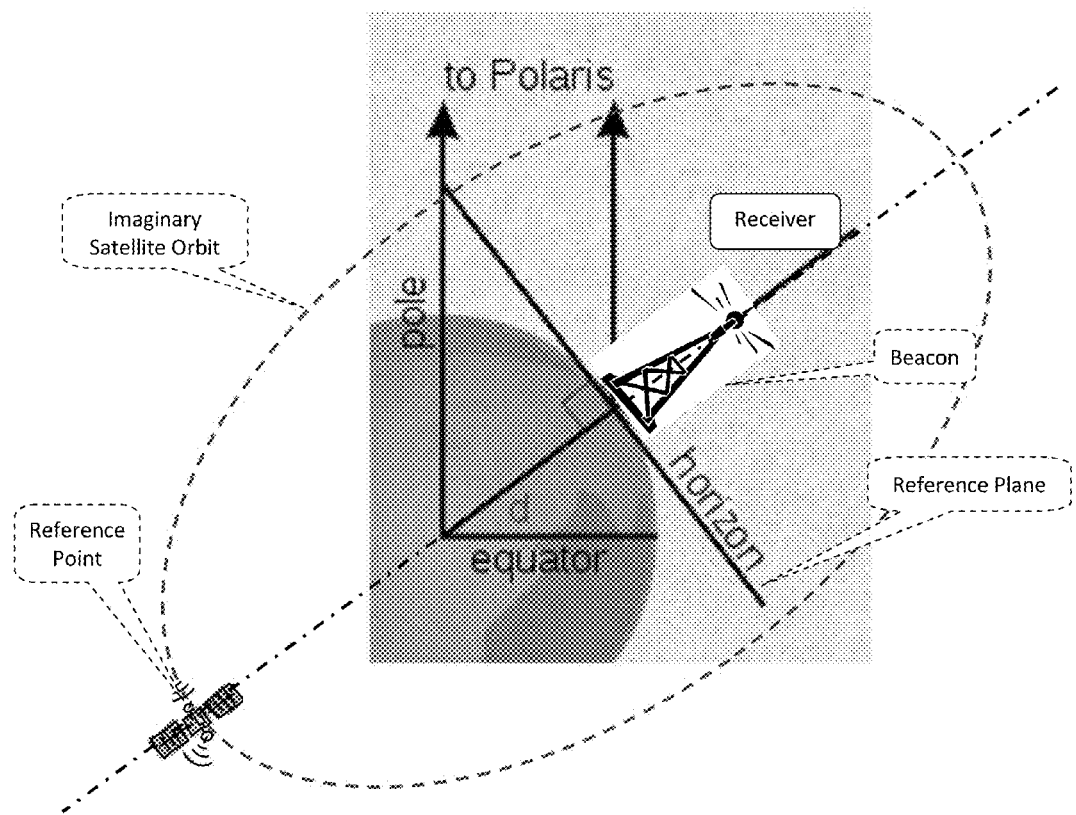
Figure 4 – System for Measuring Altitude above Mean Sea Level

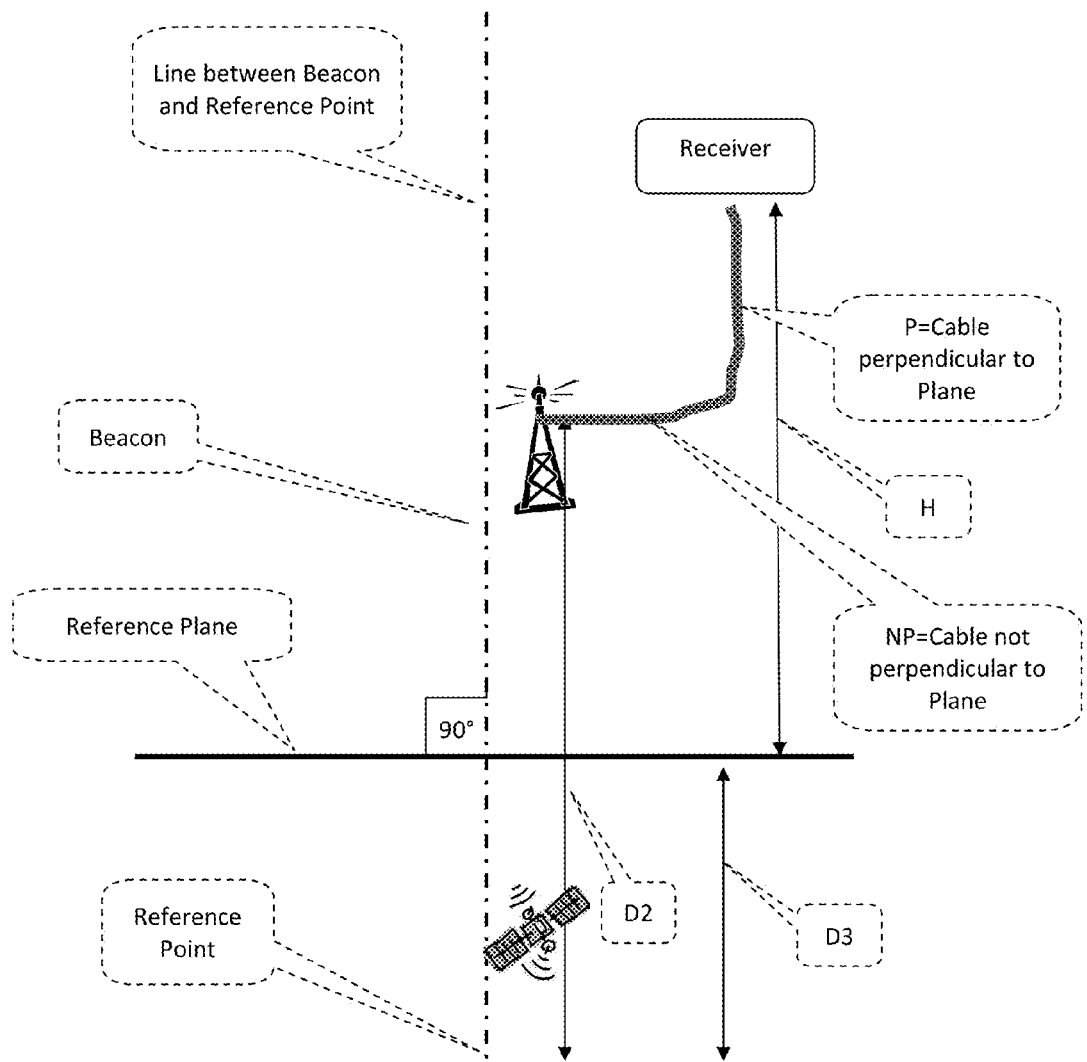
Figure 5 – System with Cable

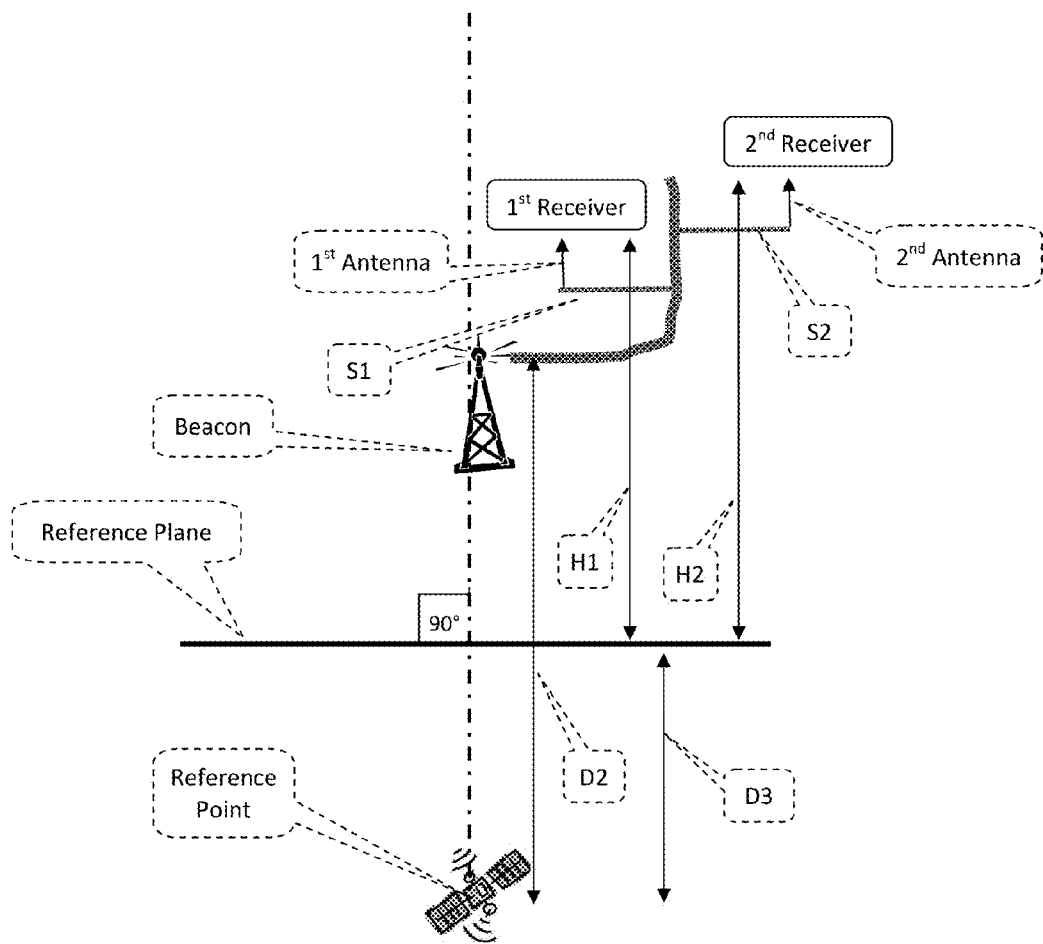
Figure 6 – System with Cable and Antennas

Figure 7 – System Installed in Elevator shaft in Multi Floor Building
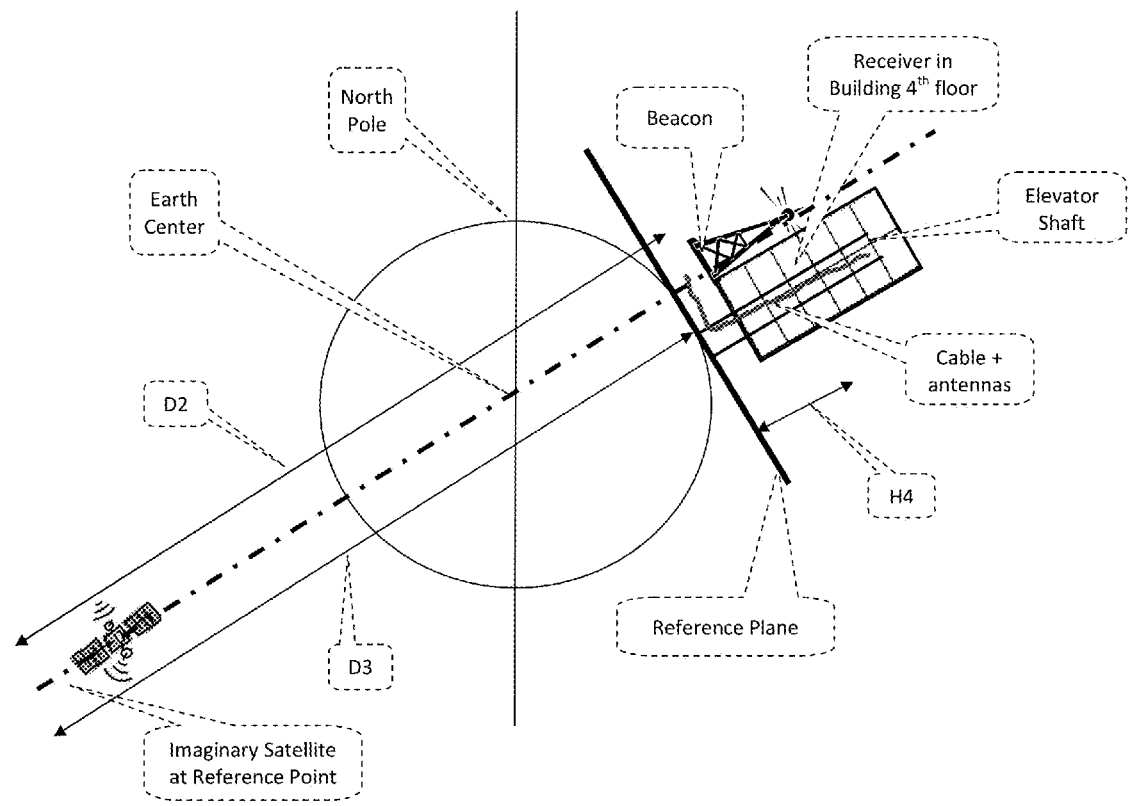

Figure 8 – Beacon Block Diagram
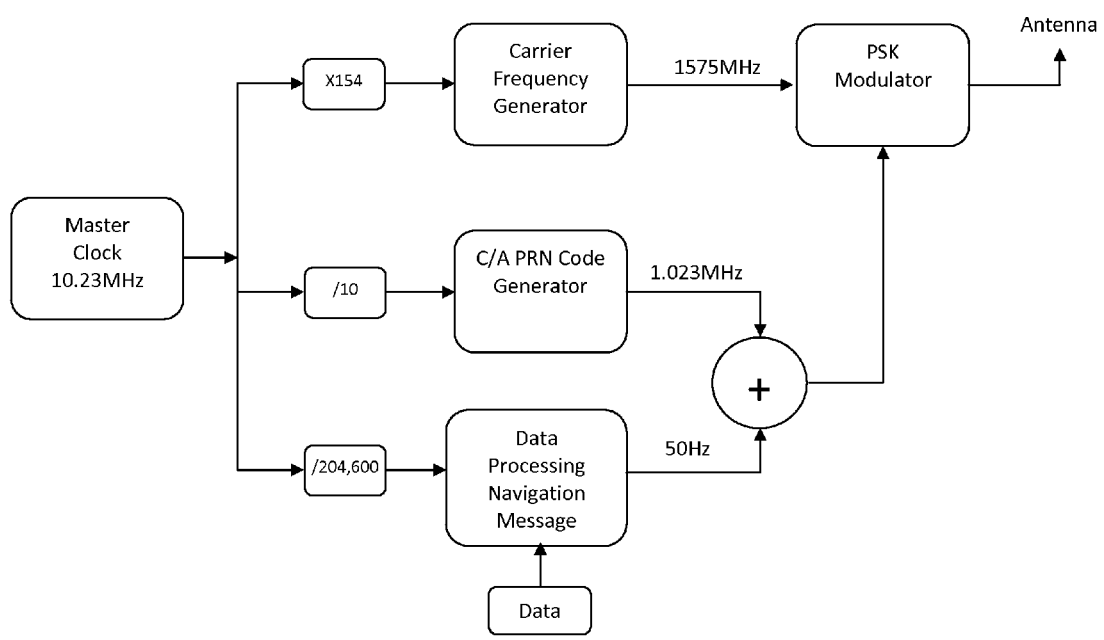

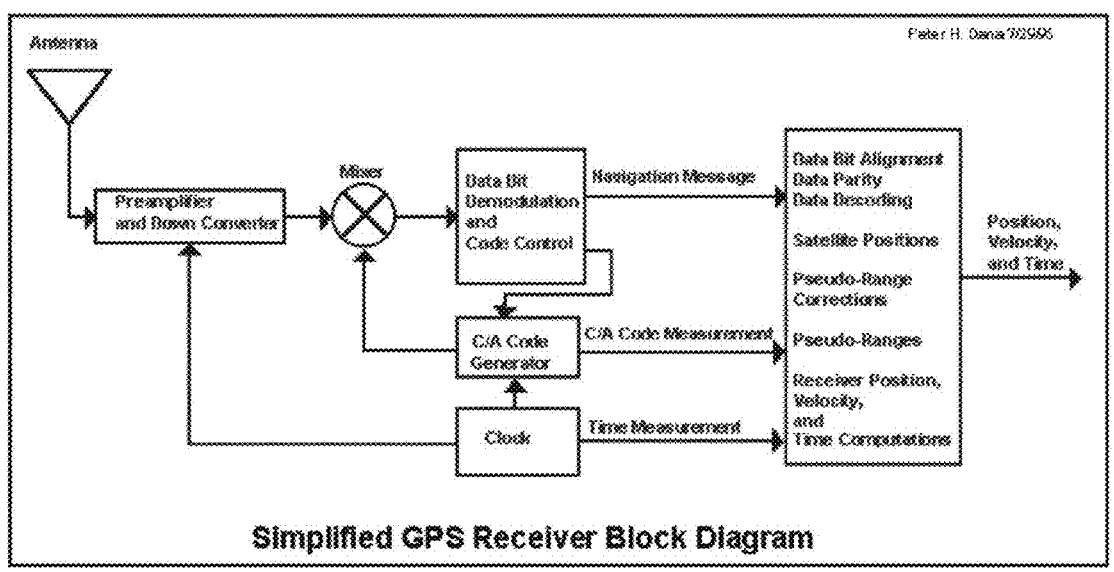
Figure 9 – Receiver (GPS) Block Diagram

INDOOR ALTITUDE MEASUREMENT BY GNSS RECEIVER

BACKGROUND OF THE INVENTION

The present invention relates to the art of digital communications, particularly to radio navigation, and more precisely to satellite based radio navigation.

Global Navigation Satellite Systems (GNSS), such as the US GPS, the European GALILEO and the Russian GLONASS, are based on a mathematical concept known in the art as "three dimensional Trilateration", where a point is determined by its distances from three other points. The point we wish to determine is the position of a GNSS receiver, typically located by the earth surface, in a car or onboard a ship or aircraft or carried by a person, while the other points are satellites orbiting around the earth. The distances between the satellites and the receiver are estimated by measuring the travelling time of signals transmitted from the satellites, at the speed of light, until arriving at the receiver. FIG. 1 depicts the GPS Trilateration Concept.

Theoretically, three distance measurements are required to resolve the three spatial coordinates (x, y, z) of the receiver. However, practically, four satellites are monitored by the receiver, in order to account also for the receiver's clock drift, compared to the accurate satellites and system clocks.

The four basic GPS equations, referred in the art as the "navigation equations" or "range equations" or "pseudo range equations", are represented as following:

$$PR_i - C^*\Delta t_{SVi} = \text{SQRT}[(x-x_i)^2 + (y-y_i)^2 + (z-z_i)^2] + C^*\Delta t_R; \quad i=1\text{-}4 \quad (1)$$

Where:

$PR_i$="Pseudo Range" between $SV_i$ (Space Vehicle i) and the receiver

C=the speed of light in free space, ~300,000 Km/sec $\Delta t_{SVi}$=$SV_i$ clock deviation from "GPS Time" (the system reference time)

x, y, z=the receiver's position (unknown, to be calculated)

$x_i, y_i, z_i$=$SV_i$ position $\Delta t_R$=the receiver's clock drift from GPS Time.

As a person skilled in the art may appreciate, the part $\text{SQRT}[(x-x_i)^2+(y-y_i)^2+(z-z_i)^2]$ expresses the geometrical distance between $SV_i$ and the receiver, in Cartesian coordinates. This expression is actually the Pythagorean theorem in three dimensions.

On the other side of equation (1), $PR_i$ also expresses the range between $SV_i$ and the receiver, however as hinted by its name, $PR_i$ is not the exact range but only an approximated range. $PR_i$ is the travelling time between $SV_i$ and the receiver, multiplied by the speed of light, yet the travelling time is estimated as the difference between detection time instant to transmission time instant of the signal, however those time instants are measured by different clocks: the receiver's clock and the satellite's clock (the transmission time instant is broadcast by the satellite). The difference between these clocks is treated in the navigation equations (1), by accounting for each clock deviation from a common and accurate clock, administered by the GPS system, named "GPS Time". Thus, $\Delta t_{SVi}$ which stands for the $SV_i$ clock deviation from the "GPS Time", and $\Delta t_R$ which stands for the receiver's clock deviation from the same "GPS Time", complement equations (1).

The basic task of a typical GNSS receiver is to resolve the four equations (1), to determine the four unknowns: x, y, z and $\Delta t_R$. Prior to resolving equations (1), the receiver has to determine the "known parameters" in equations (1), i.e. $PR_i$, $\Delta t_{SVi}$, $x_i, y_i, z_i$. For this purpose, the receiver uses information comprised in the reference signals broadcast by the GPS satellites.

As a person skilled in the art probably appreciates, the reference signals broadcast by GPS satellites are basically comprised of one or more RF carriers, modulated by two types of data streams: Pseudo-Random-Noise (PRN) codes and the navigation message.

The PRN codes are pre-known series of data, cyclically transmitted by each satellite, for synchronization and ranging purposes. Different satellites are allocated with different codes.

PRNs obtain sharp auto-correlation (i.e. correlation with same code shifted in time) and flat cross-correlation (i.e. correlation between different codes) properties. Since the receiver knows in advance exactly which satellite transmits which code, it generates a replica of this code, and a correlation between this replica and the received signal means that a specific satellite signal is detected, at a specific time instant.

The navigation message is a series of bits, organized in frames and sub frames, conveying navigational data to the receiver for resolving the navigation equations (1). Among other, the navigation message comprises information indicating the location of the GPS satellites, and information indicating the time instant when the signal was transmitted. The latter is used to determine the pseudo-range ($PR_i$), between a satellite (i) and the receiver. The navigation message comprises also the satellite clock correction information, required to determine $\Delta t_{SVi}$.

$PR_i$ is calculated as the travelling time between $SV_i$ and the receiver, multiplied by the speed of light. The transmitter and the receiver agree upon a reference point, in the navigation message stream, for which the transmitter reports the transmission time. In GPS, this point is the first bit of the subframe that follows the subframe where the transmission time is reported. When the receiver detects this bit, it records its own time, say $t_{Ri}$, then decodes the transmitted time reported by $SV_i$ in the previous subframe, say $t_{Ti}$, and determines $PR_i=C^*(t_{Ri}-t_{Ti})$. However, since the navigation message bits are transmitted at a relatively low rate, typically 50 bps, their rise time is relatively long so provide a poor resolution of the estimated receive time. In order to improve the resolution of the receive time measurement, the PRN code, at a rate of 1.023 MHz (C/A signal), is used. This code is broadcast by the satellite, synchronized with the navigation message bits, therefore, when the receiver's correlator detects a PRN code, it actually refines $t_{Ri}$, to a level of about 1% of the PRN bit period, i.e. to 10 ns, equivalent to 3 meters in pseudo range. PR determination accuracy is one of the significant factors that influence the position determination accuracy of a GPS receiver. Typically, at the beginning of 2011, the GPS C/A service provides position accuracy better than 10 meters.

Determining the precise satellite position ($x_i, y_i, z_i$) at the transmission time, is not straightforward. A GPS satellite does not report its instantaneous position, but reports parameters of a mathematical model that describes its orbit, from which its position can be calculated, for any time instant. These parameters are known in the art as the "Keplerian Elements" of the orbit. FIG. 2 illustrates the satellite orbit and the Keplerian Elements.

According to Kepler's $1^{st}$ law, GPS satellites obtain an elliptical orbit with the center of the earth at one of the ellipse foci (plural of focus). In order to determine this orbit, six Keplerian elements are typically used: 2 parameters that describe the orbit shape and size, 3 parameters that describe the orbit orientation in space, and 1 parameter to determine the momentary position of the satellite on its orbit at one specific time. These parameters are repeatedly broadcast by each GPS satellite, as part of the ephemeris in the navigation message, and been updated every couple of hours or so.

The 6 Keplerian elements describing a GPS satellite orbit are:
  i. a=semi-major axis of the ellipse
  ii. e=eccentricity of the ellipse
  iii. i=inclination between the orbit plane and the earth equator
  iv. $\Omega$=Right Ascension of Ascending Node (RAAN)=the spatial Longitude of the ascending node of the orbit
  v. $\omega$=argument of perigee=angle from the ascending node to point of closest approach
  vi. $t_{oe}$=epoch of perigee passage=time when satellite is at perigee Basically, a GPS receiver detects the Keplerian elements (and further corrections) broadcast by satellites that it tracks, and calculates the momentary position of the satellite ($x_i$, $y_i$, $z_i$), relevant for the navigation equations.

A more comprehensive description of the reference signals broadcast by GPS satellites can be found in the GPS Interface Specification (IS) documents, and in the GPS Interface Control Documents (ICD), published by US authorities. See—http://www.gps.gov/technical/icwg/

Both, IS-GPS-200E and IS-GPS-800A, dated 8 Jun. 2010, are references to the present invention.

Satellite navigation systems such as GPS, GALILEO and GLONASS, are designed to operate in open spaces, where there is substantially a line of sight between the receiver and the satellites. This is due to the relatively high frequency of the carrier of the signal broadcast by the satellites, typically in L-band. Therefore, the satellite signals can be hardly detected indoors.

In order to navigate with a GNSS receiver indoors, the present art suggests deploying an infrastructure of local transmitters that emulate satellite signals. Such local transmitters are known in the art as "Pseudolites" ("pseudo-satellites"). Pseudolites are most often small transceivers used to create a local, ground-based GPS alternative. The range of each transceiver's signal is dependent on the power available to the unit. Being able to deploy one's own positioning system, independent of the GPS, can be useful in situations where the normal GPS signals are either blocked/jammed (military conflicts), or simply not available (exploration of other planets), or applied to precision approach landing systems for aircraft and highly accurate tracking of transponders. In particular, Pseudolites gain more and more attention in the context of indoor location.

In large buildings, particularly multi floor buildings, deploying an infrastructure of pseudolites is problematic. Since GPS signals can hardly cross floors and walls, every floor and almost every room would require a dedicated set of pseudolites, and since these sets should be synchronized which each others, a huge cabling network is required or alternatively dense wireless transmissions.

Another issue concerning pseudolites is that they cannot emulate any imaginary satellite position, if a standard GPS receiver is required to detect these signals, but should be based on the Keplerian model.

Thus, the present art studies several other alternatives for indoors navigation, particularly using communication infrastructure densely deployed in urban areas, such as cellular and WLANs.

Most of these indoor navigation methods are also based on the Trilateration concept employed by GPS, wherein base stations of cellular or Access Points of WLANs replace the GPS satellites.

Such base stations may broadcast their own position, and assuming time synchronized networks, a mobile device could measure the Time of Arrival (TOA) of the signal broadcast by a cellular base station, and accordingly determine the pseudorange (or even range, if round trip signaling is feasible) to that base station. Fourth generation (4G) cellular standards such as LTE are quite concerned about these features. Similar methods can be applied in wireless LAN networks, such as WIFI or WiMAX.

Yet, in order to determine a position via Trilateration/TOA with cellular/WLAN networks, at least three such base stations should be simultaneously detected. However, typically, cellular/WLAN networks are not deployed so redundantly since differently than GPS, access to one base/reference station is enough for a mobile to communicate.

Furthermore, the Trilateration accuracy is very sensible to the geometry of the reference stations. As well known in the art, a poor geometry (i.e. low volume formed by the positions of the satellites and user) causes poor (high) DOP (dilution of position). In this context, cellular/WLAN Trilateration is expected to suffer worse DOP than GPS, due to the typically common level deployment of base stations. This poor nature of cellular/WLAN infrastructure particularly downgrades the height (or elevation or altitude) accuracy, in a way that such methods could hardly distinguish between near floors in a high building.

Therefore, it is an object of the present invention to provide a method for height determination by GNSS/GPS receivers operating indoors.

It is another object of the present invention to enable GPS receivers to determine self height indoors, at least distinguishing between floors.

It is then an object of the present invention to enable GPS receivers to determine self height indoors, deploying a modest infrastructure.

It is yet another object of the present invention to provide a method to determine the height or depth in vertically shaped spaces, such as mines, wheels and elevator shafts.

REFERENCES

IS-GPS-200E 8 Jun. 2010
GLOBAL POSITIONING SYSTEM WING (GPSW)
SYSTEMS ENGINEERING & INTEGRATION
INTERFACE SPECIFICATION
IS-GPS-200 Revision E
Navstar GPS Space Segment/Navigation User Interfaces
IS-GPS-800A 8 Jun. 2010
GLOBAL POSITIONING SYSTEM WING (GPSW)
SYSTEMS ENGINEERING & INTEGRATION
INTERFACE SPECIFICATION
IS-GPS-800 Revision A
Navstar GPS Space Segment/User Segment LIC Interface
Other objects and advantages of the invention will become apparent as the description proceeds.

SUMMARY OF THE INVENTION

The invention is directed to a method for determining the elevation of a receiver from a reference plane, configuring a beacon to broadcast signals, each of said signals specifying its transmission time instant and a reference point, said point and said beacon on a line perpendicular to said plane, said transmission time instant accounting for the distance between said point and said beacon, and configuring said receiver to detect said signals, measure the receiving time instant of the signal and determine its elevation from said plane.

Preferably, said receiver is a Global Navigation Satellite System (GNSS) receiver, and said signals emulating signals broadcast by a satellite not in view in the area where said beacon is deployed.

As a person skilled in the art probably appreciates, Global Navigation Satellite Systems (GNSSs) such as the GPS, GLONNAS and Galileo, are based on determining the range between a receiver to several satellites, a method known in the art as Trilateration. Basically, a GNSS receiver determines its range, or pseudorange, from a GNSS satellite, by measuring the travelling time of a signal broadcast by this satellite as detected by said receiver, and multiplying this travelling time by the speed of light in free space [C]. Knowing also the satellite position, the receiver can basically determine a sphere in space on which it is located.

The travelling time of the signal is basically determined as the difference between the receiving time instant, measured at the receiver, and the signal transmission time instant, reported by the satellite on the navigation message modulating this signal. Furthermore, a fast spreading sequence, known in the art as PRN, also modulates the signal, enabling the receiver to refine this range determination.

The present invention replaces the satellite with a beacon, typically deployed on the ground, where GPS satellite signals are partially or not available at all, configuring this beacon to broadcast signals similar to those broadcast by the satellites. As well known in the art, the specifications of such signals are defined and published in GPS documents, as indicated in the background of the invention chapter.

However, differently than the satellites, the disclosed beacon does not report its own position, but an imaginary position, preferably on a Keplerian orbit around the center of the earth, typically far away from the actual position of the beacon. And also differently than the satellites, the disclosed beacon does not report the real transmission time instant of each of the signals it broadcast, but corrects it according to the distance between its actual position and the imaginary position that it reports.

Thus, if the beacon reports a reference position which is $C*t1$ m (wherein C is the speed of light in free space in msec and t1 is a time interval in seconds) away from its actual position, it will specify a transmission time instant t1 seconds earlier than the real time, faking a signal that was supposedly broadcast from that imaginary reference position and already travelled $C*t1$ m to the actual position of the beacon, from which the signal is actually transmitted.

Accordingly, if the receiver is $C*t2$ m away from the beacon, it will detect this signal t2 seconds after it was transmitted by the beacon (assuming sight of line transmission), but will consider that it travelled t1+t2 seconds. However, the receiver has no information on the actual position of the beacon, rather it is configured to refer to the imaginary satellite position as the source of the signal. Thus, it is configured to determine its range from that position specified in the signal, i.e. determine its straight-line range from the imaginary position of the satellite as $C*(t1+t2)$.

Furthermore, according to the present invention, the imaginary satellite position specified by the beacon, is configured so that the line connecting the actual position of the beacon and the imaginary satellite position will be perpendicular to a certain reference plane, from which the elevation of the receiver is to be determined.

Preferably, said line substantially crosses the center of the earth and said receiver is configured to determine its altitude above mean sea level.

Accordingly, said reference plane is tangential to the reference ellipsoid, at the point where the line connecting the imaginary satellite position and the center of the earth crosses the ellipsoid.

As a skilled person may appreciate, the reference ellipsoid is a mathematical surface model that approximates the Geoid at mean sea level, and the specific model adopted by the GPS is WGS84. Thus, a GPS receiver typically reports its elevation or altitude above mean sea level referring to the WGS84 ellipsoid. Similarly, topographic maps based on the WGS84 ellipsoid define such the height.

Since a GPS receiver is typically built in with the WGS84 ellipsoid model, it can easily derive its altitude above mean sea level, upon determining its range to a satellite which is on the zenith (or the nadir for imaginary satellites), i.e. on the line that connects said receiver and the earth center.

Yet, as a skilled person probably observes, the method disclosed by now enables calculating the sum of two distances: [receiver to beacon]+[beacon to reference point], or in the terms used above, $[C*t1]+[C*t2]$, however, this sum equals the range between the receiver and the imaginary satellite only if the three: receiver, beacon and imaginary satellite are on the same line (assuming that the signal broadcast by the beacon travels in a straight line to the receiver).

So, if the signal broadcast by the beacon travels in a straight line to the receiver, which is typically the case with wireless communications with no multipath, the present method provides accurate ranging as the angle between [receiver to beacon] to [beacon to reference point] is closer to 180°.

Then, the present invention further discloses, configuring said signals to propagate through cable, at least part of the way between said beacon and said receiver, configuring said transmission time instant accounting also for the propagation time of said signals through said cable, and for the propagation time of said signals on paths not perpendicular to said plane towards said receiver.

This way, it is possible to employ the disclosed method in buildings, and also have accurate ranging even if the receiver is not on the same line with the beacon and reference point.

Since the propagation speed of an electromagnetic signal through a cable is typically slower than in free space, and since the receiver is preferably configured to assume free space radiation, as it is typically the case with GPS, then the transmission time instant should be corrected when configured to propagate through cable.

The other correction of the transmission time instant is due to propagation time of said signals on paths not perpendicular to said plane towards said receiver, i.e. paths that delay the signal and accordingly delay the receiving time instant determined at the receiver, however do not reflect the elevation of the receiver above the reference plane. In particular, a cable segment that is perpendicular to said plane, however in the opposite direction, i.e. the signal travels in a geometric direction towards the beacon, should be accounted twice, since the signal is delayed and also moved away from the receiver.

Further, as the receiver is preferably a GPS receiver equipped with an antenna and configured to detect wireless signals, typically in the L-Band, the present invention discloses that even if the signal broadcast by the beacon is part of the way routed on a cable, it is eventually configured to be coupled to one or more antennas, in places where GPS receivers operate.

So, the present invention discloses configuring said cable with antennas or leaky antennas.

As a person skilled in the art probably appreciates, leaky antennas (also known as: leaky cable antennas, Radiating Cable Antennas, Leaky Wave Antenna, Leaky Feeder Cable, Leaky Coaxial Cable), are antennas built in the cable itself, typically as slots carved on the cable.

The present invention also discloses configuring part of said cable for vertical deployment, with at least two Tee junctions, configuring each junction for connection to an antenna via a horizontal stem, and configuring the stems for substantially the same propagation time of said signals, and configuring the transmission time instant of each of said signals accounting also for propagation time on said stem.

This is another way to employ the disclosed method in buildings, and still have accurate ranging even if the receiver is not on the same line with the beacon and reference point.

The stems, or branches, from the main cable to the antenna, additionally delay the signal propagation, and should be compensated for since said stem paths are horizontal, i.e. obtain no geometrical component vertical to the reference plane, i.e. do not contribute to the elevation of the antenna.

The invention is also directed to a system for determining the elevation of a receiver from a reference plane, comprising a beacon and said receiver, said beacon configured to broadcast signals, each of said signals configured to specify its transmission time instant and a reference point, said point and said beacon on a line perpendicular to said plane, said transmission time instant accounting for the distance between said point and said beacon, and said receiver configured to detect said signals and measure the receiving time instant of the signal, and determine its elevation from said plane.

Preferably in said system, said line substantially crossing the center of the earth and said receiver configured to determine its altitude above mean sea level.

Preferably in said system, said receiver is a Global Navigation Satellite System (GNSS) receiver, and said signals emulating signals broadcast by a satellite not in view in the area where said beacon is deployed.

Also disclosed for said system that said signals are configured to propagate through cable, at least part of the way between said beacon and said receiver, said transmission time instant configured accounting also for the propagation time of said signals through said cable, and for the propagation time of said signals on paths not perpendicular to said plane towards said receiver.

Also disclosed for said system that said cable is configured with antennas or leaky antennas.

Further disclosed for said system, part of said cable configured for vertical deployment, with at least two Tee junctions, each junction configured for connection to an antenna via a horizontal stem, said stems configured for substantially the same propagation time of said signals, and the transmission time instant of each of said signals configured accounting also for propagation time on said stem.

Preferably, in the system according to the present invention said beacon is configured to broadcast signals in elevator shaft of a multi floor building.

The beacon may be configured to be coupled with an antenna and directly radiate those signals in said elevator shaft, or coupled to a cable, preferably a leaky cable, wherein said cable is configured with an antenna at every floor.

The invention is further directed to a beacon for determining the elevation of a receiver from a reference plane, said beacon configured to broadcast signals detectable by said receiver, each of said signals configured to specify its transmission time instant and a reference point, said point and said beacon on a line perpendicular to said plane, said transmission time instant accounting for the distance between said point and said beacon, wherein and said receiver configured to measure the receiving time instant of the signal and to determine its elevation from said plane.

Preferably, for said beacon, said line substantially crossing the center of the earth and said signals configured to enable said receiver to determine its elevation above mean sea level.

Preferably, for said beacon, said receiver is a Global Navigation Satellite System (GNSS) receiver, and said beacon signals emulating signals broadcast by a satellite not in view in the area where said beacon is deployed.

Also disclosed for said beacon, said signals are configured to propagate through cable, at least part of the way between said beacon and said receiver, said transmission time instant configured accounting also for the propagation time of said signals through said cable, and for the propagation time of said signals on paths not perpendicular to said plane towards said receiver.

Presently disclosed for said beacon, that said cable is configured with antennas or leaky antennas.

Further disclosed for said beacon, that part of said cable is configured for vertical deployment, with at least two Tee junctions, each junction configured for connection to an antenna via a horizontal stem, said stems configured for substantially the same propagation time of said signals, and the transmission time instant of each of said signals configured accounting also for propagation time on said stem.

The present invention discloses also a beacon coupled to a source providing accurate timing signals, at least one of: a GNSS receiver, a cellular or mobile network or base station, a Local Area Network (LAN) or Access Point (AP), a wireless LAN network or AP.

As a person skilled in the art may appreciate, communication networks, as well as GNSS receivers, coupled to the beacon, can provide an accurate GPS time reference to said beacon.

The above examples and description have been provided for the purpose of illustration, and are not intended to limit the scope of the invention in any way. As will be appreciated by the skilled person, the invention can be carried out in a variety of ways, not limited by specific terms or specific interpretations of terms as described above, all without exceeding the scope of the invention.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 1 illustrates the Basic GPS Trilateration Concept. The earth globe is represented by a circle, on which the map of the world is illustrated. Three satellites are depicted orbiting in space, around the earth, positioned at $(x_1, y_1, z_1)$, $(x_2, y_2, z_2)$ and $(x_3, y_3, z_3)$, respectfully. A receiver depicted on the earth surface, with position coordinates $(x, y, z)$. Three circles, each around a different satellite, with radii of $C \times T_1$, $C \times T_2$ and $C \times T_3$, accordingly, depict the range from each satellite to the receiver, said three circles intersecting at the receiver. At the bottom of the picture, the three navigation equations representing the basic Trilateration method, are shown:

$$\sqrt{[(x-x_1)^2+(y-y_1)^2+(z-z_1)^2]} = C \times [\text{Transmission Travel Time from SV}_1 \text{ to Receiver}] = C \times T_1$$

$$\sqrt{[(x-x_2)^2+(y-y_2)^2+(z-z_2)^2]} = C \times [\text{Transmission Travel Time from SV}_2 \text{ to Receiver}] = C \times T_2$$

$$\sqrt{[(x-x_3)^2+(y-y_3)^2+(z-z_3)^2]} = C \times [\text{Transmission Travel Time from SV}_3 \text{ to Receiver}] = C \times T_3$$

FIG. 2 illustrates the Satellite (SV) Orbit and its Keplerian Elements. The satellite orbit is depicted in a three dimensional Cartesian coordinate system, with the earth center at the origin, X-axis and Y-axis on the equator plane and Z-axis aligned with the earth rotation axis. The earth equator plane illustrated horizontally, the satellite orbit plane shown inclined at angle (i) to the equator plane, and crossing the equator plane at angle Ω from the X-axis. Angle ω indicates the direction of the semi major axis of the orbit ellipse, also known as perigee.

At the bottom of the picture, the six Keplerian Elements are defined:
- a=semi-major axis
- e=eccentricity
- i=inclination between orbit plane and equator plane
- Ω=RA (Longitude) of Ascending Node (RAAN)
- ω=argument (angle) of perigee
- $T_0$=Time when Satellite is at Perigee (=closest to earth)

FIG. 3 illustrates the Basic Geometry of a System for Measuring Elevation, according to the present invention. A receiver is shown, which its elevation (H) over a reference plane (marked by a horizontal solid line) is to be determined. A beacon, illustrated by a radiating antenna tower, configured to broadcast signals, detectable by said receiver which is at distance D1 from said beacon. Said signals emulate an imaginary satellite, depicted by a satellite icon, positioned at a reference point, at a distance D2 from said beacon. The reference point is configured so that the line (marked by dash-dot line) between it and the beacon is perpendicular to the reference plane (marked 90°). The distance between said reference point and the reference plane is depicted as D3. The angle between the line connecting the receiver and the beacon, to the line perpendicular to the reference plane is marked by φ.

FIG. 4 illustrates a System for Measuring Altitude above Mean Sea Level according to a preferred embodiment of the present invention. Part of a section of the earth is shown in the middle of the picture, wherein the equator and the North Pole are marked, meeting at the earth center. A beacon, illustrated by a radiating antenna tower, is shown above the earth surface, at latitude d (marked by the earth center). The line on which said beacon and the earth center are positioned is marked by a dash-dot line. The horizon plane (shown with a solid line) under said beacon is marked as a reference plane, perpendicular to said line. It is assumed (not shown precisely) that the reference plane touches the earth surface at mean sea level. A satellite icon is shown at a reference point, on the line connecting the beacon and the earth center, said satellite icon is also shown on an imaginary satellite orbit (marked by a dashed-line ellipse) around the center of the earth. A receiver is shown above said beacon, slightly off the line that connects the beacon, earth center and reference point.

FIG. 5 illustrates a System with Cable, according to a $2^{nd}$ embodiment of the present invention, for determining the elevation of a receiver from a reference plane. A receiver is shown, which its elevation (H) over a reference plane (marked by a horizontal solid line) is to be determined. A beacon, illustrated by a radiating antenna tower, is configured to broadcast signals, detectable by said receiver, through a cable depicted by a thick dotted-pattern line (in the shape of an inverted L). The cable comprises two main segments: a horizontal part (not perpendicular to the reference plane) with length NP, and a vertical part (perpendicular to the reference plane) with length P. The beacon signals emulate an imaginary satellite, depicted by a satellite icon, positioned at a reference point, at a distance D2 from said beacon. The reference point is configured so that the line (marked by dash-dot line) between it and the beacon is perpendicular to the reference plane (marked 90°). The distance between said reference point and the reference plane is depicted as D3.

FIG. 6 illustrates a System with Cable and Antennas, according to a $3^{rd}$ embodiment of the present invention, for determining the elevation of a receiver from a reference plane. Two receivers are shown, a first receiver and a second receiver, which their elevation (H1 and H2 correspondingly) over a reference plane (marked by a horizontal solid line) are to be determined. A beacon, illustrated by a radiating antenna tower, is configured to broadcast signals, detectable by said receivers, through a cable depicted by a dotted-pattern line. The cable comprises a main part (depicted in thicker line, comprising a horizontal part and a vertical part) and two horizontal branches or stems (depicted in thinner lines) coupled to the vertical part of the main cable: stem S1 connecting a $1^{st}$ antenna, and stem S2 connecting a $2^{nd}$ antenna. Both stems are configured for the same propagation time of the signals, so practically obtain the same length S. An icon of a satellite depicts a reference point specified by the beacon signals, at a distance D2 from said beacon. The reference point is configured so that the line (marked by dash-dot line) between it and the beacon is perpendicular to the reference plane (marked 90°). The distance between said reference point and the reference plane is depicted as D3.

FIG. 7 illustrates a System installed in Elevator Shaft in a Multi Floor Building, according to a $4^{th}$ embodiment of the present invention, for determining the elevation of a receiver from a reference plane. The earth is shown as a circle, where the center of the earth and the North Pole are marked. A building obtaining 6 floors is shown on the surface of the earth, in which, a receiver in the $4^{th}$ floor is indicated, which its elevation H4 over a reference plane (marked by a horizontal solid line) is to be determined. A beacon, illustrated by a radiating antenna tower by the building, is configured to broadcast signals detectable by said receiver, through a cable. The cable comprises a horizontal part and a vertical part, depicted in the elevator shaft of the building, and antennas configured on its vertical part (marked but not explicitly shown), at every floor. An icon of a satellite depicts a reference point specified by the beacon signals, at a distance D2 from said beacon. The reference point is configured so that the line (marked by dash-dot) between it and the beacon is perpendicular to the reference plane and crosses the earth center. The distance between said reference point and the reference plane is marked D3.

FIG. 8 illustrates the Beacon Block Diagram, according to a preferred embodiment of the present invention. From left side, a master clock block is depicted, generating a basic frequency of 10.23 MHz used to derive the carrier frequency L1=1575 MHz (upper branch), the PRN code at 1.023 MHz (center branch), and the Data (navigation message) clock at 50 Hz (lower branch). The navigation message is depicted as the Data output from the Data processing block (lower branch), and the C/A PRN code is depicted as the output of the C/A code generator (center branch). A round circle with an internal plus sign illustrates the exclusive-or (XOR) function employed on the data and PRN code, and a BPSK block illustrates the modulation of said XOR product on the L1 carrier, resulting with a signal to be transmitted, by the antenna shown at the upper-right side of the picture.

FIG. 9 illustrates a GPS Receiver Block Diagram, according to a preferred embodiment of the present invention. An antenna is depicted at the left side, from which the received signal is routed to a Preamplifier and Down Converter, then right to a Mixer. The C/A Code Generator, shown at the center of the picture, gets one input from the Data Bit Demodulation and Code Control block, and another input from the Clock block. Accordingly, the C/A Code Generator is shown to output C/A Code Measurement. The Data Bit Demodulation and Code Control block, shown at the mid-upper branch, gets the mixer output signal, and outputs the Navigation Message. The large block shown at the right, typically implemented by an embedded micro processor or DSP core, gets three inputs: Navigation Message, C/A Code Measurement and Time Measurements. This block, shown to output Position, Velocity and Time, is preferably configured to calculate the satellite position and range to said satellite, and according to the present invention, determine the receiver elevation above mean sea level.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

The invention is directed to a method for determining the elevation of a receiver from a reference plane, configuring a beacon to broadcast signals, each of said signals specifying its transmission time instant and a reference point, said point and said beacon on a line perpendicular to said plane, said transmission time instant accounting for the distance between said point and said beacon, and configuring said receiver to detect said signals, measure the receiving time instant of the signal and determine its elevation from said plane.

FIG. 3 illustrates the Basic Geometry of a System for Measuring Elevation, according to the present invention. A receiver is shown, which its elevation (H) over a reference plane (marked by a horizontal solid line) is to be determined. A beacon, illustrated by a radiating antenna tower, is configured to broadcast signals, detectable by said receiver which is at distance D1 from said beacon. Said signals emulate an imaginary satellite, depicted by a satellite icon, positioned at a reference point, at a distance D2 from said beacon. The reference point is configured so that the line (marked by dash-dot line) between it and the beacon is perpendicular to the reference plane (marked 90°). The distance between said reference point and the reference plane is depicted as D3. The angle between the line connecting the receiver and the beacon, to the line perpendicular to the reference plane is marked φ.

According to a preferred embodiment of the present invention, said line substantially crosses the center of the earth and said receiver is configured to determine its altitude above mean sea level.

FIG. 4 illustrates a System for Measuring Altitude above Mean Sea Level according to the preferred embodiment of the present invention. Part of a section of the earth is shown in the middle of the picture, wherein the equator and the North Pole are marked, meeting at the earth center. A beacon, illustrated by a radiating antenna tower, is shown above the earth surface, at latitude d (marked by the earth center). The line on which said beacon and the earth center are positioned is marked by a dash-dot line. The horizon plane (shown with a solid line) under said beacon is marked as a reference plane, perpendicular to said line. The reference plane is configured (not shown precisely) to touch the earth surface at mean sea level. A satellite icon is shown at a reference point, on the line connecting the beacon and the earth center, said satellite icon is also shown on an imaginary satellite orbit (marked by a dashed-line ellipse) around the center of the earth. A receiver is shown above said beacon, slightly off the line that connects the beacon, earth center and reference point.

Reviewing FIG. 3 according to said preferred embodiment, the reference plane is mean sea level, and the elevation H of the receiver is elevation or altitude or height above mean sea level.

According to the preferred embodiment of the present invention, said receiver is a Global Navigation Satellite System (GNSS) receiver, and said signals emulating signals broadcast by a satellite not in view in the area where said beacon is deployed.

FIG. 8 illustrates the Beacon Block Diagram, according to the preferred embodiment of the present invention. From left side, a master clock block is depicted, generating a basic frequency of 10.23 MHz used to derive the carrier frequency L1=1575 MHz (upper branch), the PRN code at 1.023 MHz (center branch), and the Data (navigation message) clock at 50 Hz (lower branch). The navigation message is depicted as the Data output from the Data processing block (lower branch), and the C/A PRN code is depicted as the output of the C/A code generator (center branch). A round circle with an internal plus sign illustrates the exclusive-or (XOR) function employed on the data and PRN code, and a BPSK block illustrates the modulation of said XOR product on the L1 carrier, resulting with a signal to be transmitted, by the antenna shown at the upper-right side of the picture.

According to said preferred embodiment of the present invention, the signals broadcast by said beacon emulate GPS signals. Furthermore, the navigation message broadcast by said beacon is configured to specify Keplerian Elements indicating an imaginary satellite positioned at a specific reference point, at the time of transmission. This reference point is configured so that it will be on the line connecting the actual position of the beacon (upon specific deployment) and earth center, at the transmission time (for which the Trilateration navigation equations refer to). As illustrated in FIG. 4, the line between the beacon and earth center is perpendicular to the horizon plane.

Basically, configuring the beacon to emulate GPS alike signals is done according to the GPS Interface Specifications, documents that are well known in the art, as indicated in the background of the invention chapter.

The navigation message is further configured, according to said preferred embodiment, to specify a transmission time instant accounting for the distance between said reference point and said beacon, and so is also configured the PRN code which modulates the signal.

Thus, if the beacon reports a reference position which is C*t1 m (wherein C is the speed of light in free space in msec and t1 is a time interval in seconds) away from its actual position (marked as D2 in FIG. 3), it will specify a transmission time instant t1 seconds earlier than the real time. This can be implemented by modifying one or more of the following: the transmission time stamp in the navigation message, the phase of the PRN code, or the satellite clock corrections to GPS time.

As a skilled person may appreciate, the time stamp in the navigation message is implemented in the HOW word contained in every subframe, in a format known as Z-Count. Yet, Z-Count represents the transmission time instant in ×1.5 seconds steps so for the present invention suits only for coarse corrections.

However, shifting the C/A PRN by one chip, configures a delay of 1 microsecond, equivalent to 300 meters, which provides a good resolution for the purpose of the present invention, since GPS satellites are typically 67,000 microseconds away (about 20,000 Kilometers) from earth surface. Obviously, it is possible to manipulate the PRN timing and phase by fractions of a chip and achieve finer corrections.

The satellite clock correction to GPS time is represented by three parameters, broadcast in subframe one of the navigation message. These parameters, assigned $a_{f0}$, $a_{f1}$ and $a_{f2}$, are coefficients for a clock correction formula, well known in the art, where $a_{f0}$ is the clock offset in seconds, $a_{f1}$ is the linear drift rate in seconds per second, and $a_{f2}$ is the quadratic clock error in seconds per seconds squared, all referring to a specific time epoch. These parameters are represented in the navigation message at a very high resolution, for example $a_{f0}$ Least Significant Bit (LSB) is $10^{-31}$ seconds, so may be quite useful for fine tuning the transmission time instant, according to the present invention.

GPS satellites broadcast another correction to the clock that may be used to modify the transmission time instant considered by the receiver according to the present invention: group delay to calculate the Ionospheric delay.

It is to be noted that a GPS satellite clock is configured considering relativistic effects, which should be differently considered regarding to terrestrial beacons. According to Special Relativity the frequency of atomic clocks moving at orbital speeds are slower than stationary ground clocks. According to General Relativity, a clock away to a massive object runs faster than a close clock, so satellite clocks are faster than clocks on earth. Combining both effects, the discrepancy is ~38 µs/day. To offset that, satellite atomic clocks are set prior to launch at 10.22999999543 MHz instead of 10.23 MHz.

Further according to said preferred embodiment of the present invention, the beacon emulates a satellite not in view in the area where said beacon is deployed. As a person skilled in the art may appreciate, and as published by the GPS ICD, GNSSs assign parameters (e.g. ID, PRN) defining more satellites than are actually deployed. Some of these satellite assigned parameters are still unused, while others are used by Satellite-Based Augmentation Systems (SBAS), such as WAAS (above the USA), EGNOS (above Europe), MSAS (above Japan) and GAGAN launched to cover India.

SBAS is a system of satellites and ground stations providing GPS signal corrections, improving position accuracy and alerting for service issues. All SBASs comply with a common global standard and are interoperable and compatible with standard GPS receivers.

More information can be found at:
http://egnos-portal.gsa.europa.eu/discover-egnos/about-egnos/what-is-sbas- So according to the preferred embodiment of the present invention, beacons deployed in the USA will be configured to EGNOS PRN codes, or MSAS codes, or GAGAN codes, or unused GPS codes. Similarly, beacons deployed in Europe will be configured to WAAS or MSAS or GAGAN codes, or unused GPS codes, and so on.

FIG. 9 illustrates a GPS Receiver Block Diagram, according to the preferred embodiment of the present invention. An antenna is depicted at the left side, from which the received signal is routed to a Preamplifier and Down Converter, then right to a Mixer. The C/A Code Generator, shown at the center of the picture, gets one input from the Data Bit Demodulation and Code Control block, and another input from the Clock block. Accordingly, the C/A Code Generator is shown to output C/A Code Measurement. The Data Bit Demodulation and Code Control block, shown at the mid-upper part, gets the mixer output signal, and outputs the Navigation Message. The large block shown at the right, typically implemented by an embedded micro processor or DSP core, gets three inputs: Navigation Message, C/A Code Measurement and Time Measurements. This block, shown to output Position, Velocity and Time, is preferably configured to calculate the satellite position and range to said imaginary satellite, and determine the receiver elevation above mean sea level.

Back to FIG. 3, according to the preferred embodiment of the present invention, the receiver is configured to measure its range to the imaginary satellite at the reference point, which signals it apparently detects. However, since the signals are actually transmitted by the beacon, and not by the imaginary satellite, and since the signal transmission time instant is configured to specify transmission time instant earlier by D2/C (where D2 is the distance between the actual beacon position and the imaginary satellite position, and C is the speed of light in free space), then the measured range will read D1+D2 (where D1 is the distance between the beacon and the receiver). Still, the receiver is configured to determine H, its elevation above the reference plane, as D1+D2−D3, where D3 is the distance between the imaginary satellite position and the reference plane. As discussed before, the more the angle φ is closer to zero, the more accurate will be H determined, as the sum [D1+D2] is closer to the sum [H+D3].

So, the receiver, according to the preferred embodiment of the present invention, is configured to determine its elevation H above said reference plane, as following:

1. R=range between the receiver and the imaginary satellite.
2. D3=distance between the imaginary satellite and the reference plane.
3. H=R−D3

As discussed before, R=(receiving time instant−transmission time instant)*C, yet it is paramount at this step to use the same time reference (preferably the GPS time) for determining the transmission and receiving time instants. Thus, the beacon is configured to report its clock offset from the GPS time, and the receiver is configured to account for said beacon clock offset, as well as its own clock offset from GPS time. The receiver clock offset (assigned as $\Delta t_R$ in the navigation equations) is assumed to be already derived by the receiver, when solving the navigation equations elsewhere (typically outdoors).

As a skilled person may appreciate, FIG. 4 (and others) depicts the imaginary satellite in the nadir of the beacon, i.e. towards the center of the earth, and though apparently the earth blocks the broadcast signals, actually as long as the receiver can detect the signals broadcast by the beacon, it is feasible. Furthermore, the imaginary satellite may be configured in the zenith of the beacon, and then, the last step above for the receiver to determine its elevation would be H=D3−R (instead of H=R−D3).

According to the preferred embodiment of the present invention, the reference plane is configured as a plane tangential to the ellipsoid (practically, the ellipsoid itself, since for small areas the ellipsoid can be considered flat), just under the beacon. Back to FIG. 3, the receiver, which is a GPS receiver according to the preferred embodiment of the present invention, is configured to determine D3 as the distance between the imaginary satellite position (reference point) and the WGS84 ellipsoid (reference plane), at the point where the line connecting the imaginary satellite position and earth center crosses the ellipsoid.

As a person skilled in the art may appreciate, once the receiver determines the imaginary satellite position, it is a straight forward mathematical task to determine D3, providing that the receiver obtains the WGS84 model. Furthermore, there are several ways to configure the receiver to consider the imaginary satellite position as a reference point for determining its elevation above the ellipsoid. One way is to consider the specific PRN code of the imaginary satellite as an identifier. Another way is to configure the receiver to distinguish between static satellite positions, as according to the present invention, to dynamic satellite positions as is with real satellites.

Further according to the preferred embodiment of the present invention, said beacon is deployed at the bottom of an elevator shaft, radiating upwards, or at the top of an elevator shaft, radiating downwards. A beacon deployed at the bottom of the shaft is configured to specify an imaginary satellite in the nadir, while a beacon deployed at the top of the elevator shaft is configured to specify an imaginary satellite in the zenith.

According to a $2^{nd}$ embodiment of the present invention, the beacon signals are configured to propagate through cable, at least part of the way between the beacon and the receiver, configuring the transmission time instant accounting also for the propagation time of said signals through said cable, and for the propagation time of said signals on paths not perpendicular to said plane towards said receiver.

FIG. 5 illustrates a System with Cable, according to a $2^{nd}$ embodiment of the present invention, for determining the elevation of a receiver from a reference plane. A receiver is shown, which its elevation (H) over a reference plane (marked by a horizontal solid line) is to be determined. A beacon, illustrated by a radiating antenna tower, is configured to broadcast signals, detectable by said receiver, through a cable depicted by a thick dotted-pattern line (in the shape of an inverted L). The cable comprises two main segments: a horizontal part (not perpendicular to the reference plane) with length NP, and a vertical part (perpendicular to the reference plane) with length P. The beacon signals emulate an imaginary satellite, depicted by a satellite icon, positioned at a reference point, at a distance D2 from said beacon. The reference point is configured so that the line (marked by dash-dot line) between it and the beacon is perpendicular to the reference plane (marked 90°). The distance between said reference point and the reference plane is depicted as D3.

According to said $2^{nd}$ embodiment of the present invention, the transmission time instant is configured to be earlier (or late, if negative) than the real time, by the following accumulative factors:
a. D2/C, accounting for the distance D2 between the actual beacon position and the imaginary satellite position, wherein and C is the speed of the signal in free space.
b. $-(P+NP)*(1/C'-1/C)$, accounting for the propagation time of said signals through said cable, wherein C' is the speed of the signal in the cable and C is the speed of the signal in free space.
c. $-NP/C'$, accounting for the propagation time of said signals on paths not perpendicular to said plane towards said receiver.

The receiver, according to the $2^{nd}$ embodiment of the present invention, is configured to determine its elevation H above said reference plane, as according to the preferred embodiment of the invention.

The disclosed method is further elaborated, in order to employ it indoors, and perform accurate ranging even if the receiver is not on the same line with the beacon and reference point, and further considering compatibility with standard GPS receivers configured with wireless antennas.

So, the present invention discloses configuring said cable with antennas or leaky antennas.

Further, the present invention discloses configuring part of said cable for vertical deployment, with at least two Tee junctions, configuring each junction for connection to an antenna via a horizontal stem, and configuring the stems for substantially the same propagation time of said signals, and configuring the transmission time instant of each of said signals accounting also for propagation time on said stem.

FIG. 6 illustrates a System with Cable and Antennas, according to a $3^{rd}$ embodiment of the present invention, for determining the elevation of a receiver from a reference plane. Two receivers are shown, a first receiver and a second receiver, which their elevation (H1 and H2 correspondingly) over a reference plane (marked by a horizontal solid line) are to be determined. A beacon, illustrated by a radiating antenna tower, is configured to broadcast signals, detectable by said receivers, through a cable depicted by a dotted-pattern line. The cable comprises a main part (depicted in thicker line, comprising a horizontal part and a vertical part) and two horizontal branches or stems (depicted in thinner lines) coupled to the vertical part of the main cable: stem S1 connecting a $1^{st}$ antenna, and stem S2 connecting a $2^{nd}$ antenna. Both stems are configured for the same propagation time of the signals, so practically obtain the same length S. An icon of a satellite depicts a reference point specified by the beacon signals, at a distance D2 from said beacon. The reference point is configured so that the line (marked by dash-dot line) between it and the beacon is perpendicular to the reference plane (marked 90°). The distance between said reference point and the reference plane is depicted as D3.

According to said $3^{rd}$ embodiment of the present invention, the transmission time instant is configured to be earlier (or later, for negative numbers) than the real time, by the factors determined according to the $2^{nd}$ embodiment, plus the propagation time on said stem, represented by $-S/C''$, where S is the stem length and C'' is the speed of the signal through the stem.

Each receiver, according to the $3^{rd}$ embodiment of the present invention, is configured to determine its elevation above said reference plane, as according to the preferred embodiment of the invention.

Further, the present invention discloses configuring the beacon to broadcast signals in the elevator shaft of a multi floor building.

The beacon may be configured to be coupled to an antenna and directly radiate said signals in the elevator shaft, or coupled to a cable routed through this elevator shaft, preferably a leaky cable, wherein said cable is configured with an antenna at every floor.

FIG. 7 illustrates a System installed in Elevator Shaft in a Multi Floor Building, according to a $4^{th}$ embodiment of the present invention, for determining the elevation of a receiver from a reference plane. The earth is shown as a circle, where the center of the earth and the North Pole are marked. A building obtaining 6 floors is shown on the surface of the earth, in which, a receiver in the $4^{th}$ floor is indicated, which its elevation H4 over a reference plane (marked by a horizontal solid line) is to be determined. A beacon, illustrated by a radiating antenna tower by the building, is configured to broadcast signals detectable by said receiver, through a cable. The cable comprises a horizontal part and a vertical part, depicted in the elevator shaft of the building, and antennas configured on its vertical part (marked but not explicitly shown), at every floor. An icon of a satellite depicts a reference point specified by the beacon signals, at a distance D2 from said beacon. The reference point is configured so that the line (marked by dash-dot) between it and the beacon is perpendicular to the reference plane and crosses the earth center. The distance between said reference point and the reference plane is marked D3.

Further, the beacon and the receiver according to said 4$^{th}$ embodiment of the present invention are configured similarly as according to the 3$^{rd}$ embodiment of the present invention.

The invention is also directed to a system for determining the elevation of a receiver from a reference plane, comprising a beacon and said receiver, said beacon configured to broadcast signals, each of said signals configured to specify its transmission time instant and a reference point, said point and said beacon on a line perpendicular to said plane, said transmission time instant accounting for the distance between said point and said beacon, and said receiver configured to detect said signals and measure the receiving time instant of the signal, and determine its elevation from said plane.

Preferably in said system, said line substantially crossing the center of the earth and said receiver configured to determine its altitude above mean sea level.

Preferably in said system, said receiver is a Global Navigation Satellite System (GNSS) receiver, and said signals emulating signals broadcast by a satellite not in view in the area where said beacon is deployed.

Also disclosed for said system that said signals are configured to propagate through cable, at least part of the way between said beacon and said receiver, said transmission time instant configured accounting also for the propagation time of said signals through said cable, and for the propagation time of said signals on paths not perpendicular to said plane towards said receiver.

Also disclosed for said system that said cable is configured with antennas or leaky antennas.

Further for said system, part of said cable configured for vertical deployment, with at least two Tee junctions, each junction configured for connection to an antenna via a horizontal stem, said stems configured for substantially the same propagation time of said signals, and the transmission time instant of each of said signals configured accounting also for propagation time on said stem.

Preferably, in the system according to the present invention, said beacon is configured to broadcast signals in elevator shaft of a multi floor building.

The invention is further directed to a beacon for determining the elevation of a receiver from a reference plane, said beacon configured to broadcast signals detectable by said receiver, each of said signals configured to specify its transmission time instant and a reference point, said point and said beacon on a line perpendicular to said plane, said transmission time instant accounting for the distance between said point and said beacon, wherein said receiver configured to measure the receiving time instant of the signal and to determine its elevation from said plane.

Preferably, for said beacon, said line substantially crossing the center of the earth and said signals configured enabling said receiver to determine its elevation above mean sea level.

Preferably, for said beacon, said receiver is a Global Navigation Satellite System (GNSS) receiver, and said beacon signals emulating signals broadcast by a satellite not in view in the area where said beacon is deployed.

Further for said beacon, said signals are configured to propagate through cable, at least part of the way between said beacon and said receiver, said transmission time instant configured accounting also for the propagation time of said signals through said cable, and for the propagation time of said signals on paths not perpendicular to said plane towards said receiver.

Presently disclosed for said beacon, that said cable is configured with antennas or leaky antennas.

Also disclosed for said beacon, that part of said cable is configured for vertical deployment, with at least two Tee junctions, each junction configured for connection to an antenna via a horizontal stem, said stems configured for substantially the same propagation time of said signals, and the transmission time instant of each of said signals configured accounting also for propagation time on said stem.

The present invention discloses also a beacon coupled to a source providing accurate timing signals, at least one of: a GNSS receiver, a cellular or mobile network or base station, a Local Area Network (LAN) or Access Point (AP), a wireless LAN or AP.

The above examples and description have been provided for the purpose of illustration, and are not intended to limit the scope of the invention in any way. As will be appreciated by the skilled person, the invention can be carried out in a variety of ways, not limited by specific terms or specific interpretations of terms as described above, all without exceeding the scope of the invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method for determining the elevation of a receiver from a reference plane, configuring a beacon to broadcast signals detectable by said receiver, at least one of said signals specifying its transmission time instant and a reference point, said point reporting an imaginary position of said beacon, said point and said beacon substantially on a line perpendicular to said plane, and said transmission time instant accounting for the distance between said point and said beacon.

2. A method according to claim 1, said line substantially crossing the center of the earth and configuring said receiver to determine its altitude above mean sea level.

3. A method according to claim 1, wherein said receiver is configured to detect Global Navigation Satellite System (GNSS) signals or substantially alike.

4. A method according to claim 1, configuring said signals to propagate through cable, at least part of the way between said beacon and said receiver.

5. A method according to claim 4, configuring said cable with antennas or leaky antennas.

6. A method according to claim 4, configuring the transmission time instant of said at least one of said signals accounting also for propagation time on said cable.

7. A receiver for determining the elevation from a reference plane, configured to detect signals transmitted by a beacon, at least one of said signals configured to specify its transmission time instant and a reference point, said point reporting an imaginary position of the beacon, said point and said beacon on a line substantially perpendicular to said plane, and said transmission time instant accounting for the distance between said point and said beacon.

8. A receiver according to claim 7, said line substantially crossing the center of the earth and said receiver configured to determine its altitude above mean sea level.

9. A receiver according to claim 7, configured to detect Global Navigation Satellite System (GNSS) signals or substantially alike.

10. A receiver according to claim 7, said at least one of said signals configured to propagate through cable, at least part of the way between said beacon and said receiver.

11. A receiver according to claim 10, said cable configured with antennas or leaky antennas.

12. A receiver according to claim 10, the transmission time instant of said at least one of said signals configured accounting also for propagation time on said cable.

13. A receiver according to claim 7, said beacon configured to broadcast signals in elevator shaft.

14. A beacon for determining the elevation of a receiver from a reference plane, said beacon configured to broadcast signals detectable by said receiver, at least one of said signals configured to specify its transmission time instant and a reference point, said point reporting an imaginary position of the beacon, said point and said beacon on a line substantially perpendicular to said plane, and said transmission time instant accounting for the distance between said point and said beacon.

15. A beacon according to claim 14, said line substantially crossing the center of the earth and said signals configured enabling said receiver to determine its elevation above mean sea level.

16. A beacon according to claim 14, said at least one of said signals substantially emulating a signal broadcast by a Global Navigation Satellite System (GNSS).

17. A beacon according to claim 14, said signals configured to propagate through cable, at least part of the way between said beacon and said receiver.

18. A beacon according to claim 17, said cable configured with antennas or leaky antennas.

19. A beacon according to claim 17, the transmission time instant of said at least one of said signals configured accounting also for propagation time on said cable.

20. A beacon according to claim 14, coupled to a source providing accurate timing signals, at least one of: a GNSS receiver, a cellular or mobile network or base station, a Local Area Network (LAN) or Access Point (AP), a wireless LAN or AP.

* * * * *